United States Patent [19]

Naunapper et al.

[11] Patent Number: 4,535,006
[45] Date of Patent: Aug. 13, 1985

[54] DEVICE FOR USE IN FLUIDIZED BED TECHNIQUES AND ITS METHOD OF USE

[75] Inventors: Dietmar Naunapper, Oberrimsingen; Günter Braun, Grenzach-Wyhlen, both of Fed. Rep. of Germany

[73] Assignee: Glatt GmbH, Binzen, Fed. Rep. of Germany

[21] Appl. No.: 540,966

[22] Filed: Oct. 11, 1983

[30] Foreign Application Priority Data

Oct. 8, 1982 [DE] Fed. Rep. of Germany ....... 3237303

[51] Int. Cl.³ ............................................. B05D 1/22
[52] U.S. Cl. .................................... 427/213; 427/185; 118/694; 118/712; 118/691; 118/688; 118/DIG. 5
[58] Field of Search ............... 118/668, 694, 712, 303, 118/DIG. 5, 691, 688; 427/185, 213

[56] References Cited

U.S. PATENT DOCUMENTS

| | | | |
|---|---|---|---|
| 2,458,674 | 1/1949 | Blanchard et al. | 118/691 |
| 3,241,520 | 3/1966 | Wurster et al. | 118/303 |
| 3,951,099 | 4/1976 | Minckler | 118/694 |
| 3,961,600 | 6/1976 | Homer et al. | 118/694 |
| 4,008,685 | 2/1977 | Pierce | 118/DIG. 5 |
| 4,117,801 | 10/1978 | Dannelly et al. | 118/303 X |
| 4,406,247 | 9/1983 | Baughman | 118/694 |

Primary Examiner—Shrive P. Beck
Attorney, Agent, or Firm—Fleit, Jacobson, Cohn & Price

[57] ABSTRACT

A device for use in fluidized bed techniques, particularly for coating tablets or the like, which comprises a container for use as a processing zone for the material to be processed, a sensor device or the like for monitoring the upper end area of the processing zone, and apparatus for moving the material through the processing zone.

14 Claims, 5 Drawing Figures

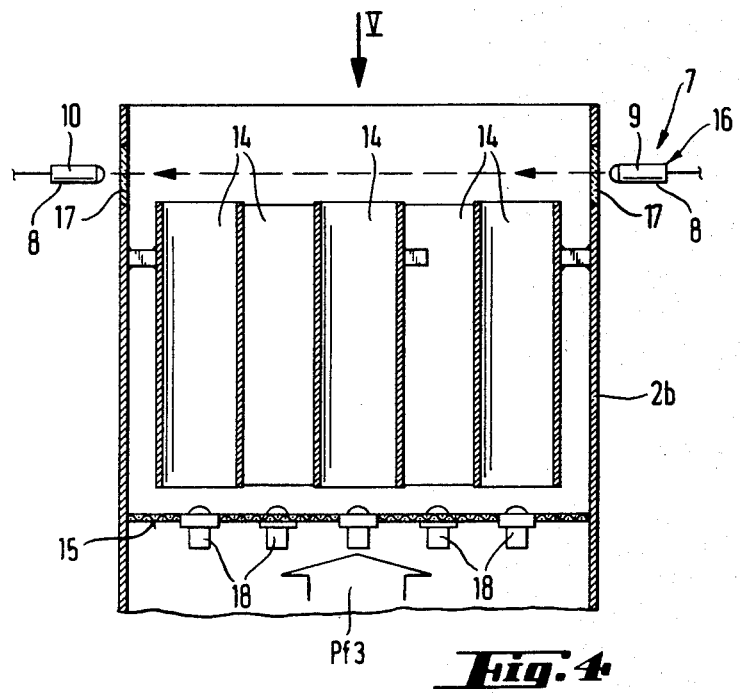
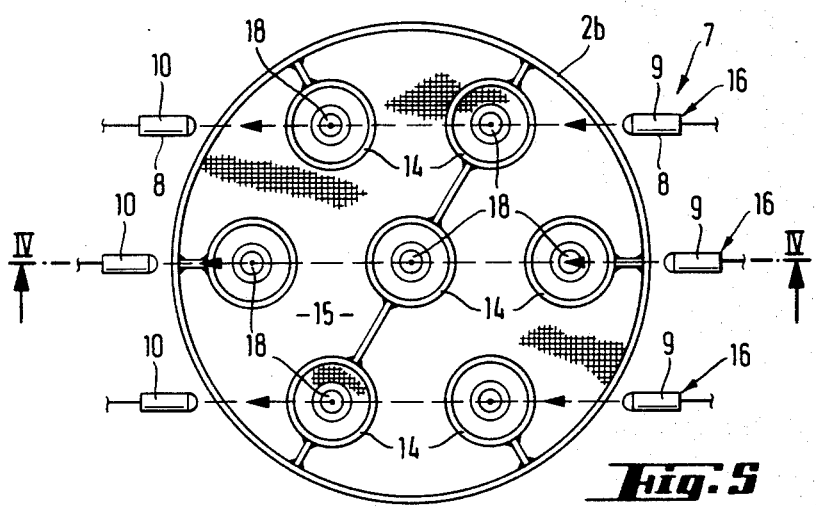

DEVICE FOR USE IN FLUIDIZED BED TECHNIQUES AND ITS METHOD OF USE

BACKGROUND OF THE INVENTION

The invention concerns a device for fluid bed techniques, in particular for the coating of tablets or the like. The device has a container through which an adjustable gas current flows to move the tablets or any similar objects through a processing zone.

In fluidized bed techniques, the container acts as a processing zone in which the tablets or similar objects are processed, dried, and/or treated. In order to optimize the processing of the tablets or the like, a certain spatial extent of the processing zones and/or of the extension of the fluidized bed is required, particularly with regard to the "flight altitude" of the tablets or the like. An analogous rule applies to fluidized bed granulation. One means of controlling the fluidized bed is by varying the gas flow into the processing zone. As is well known, this can be accomplished by manually changing the air volume, e.g. by means of an air slide, until the desired height of the fluidized bed has been achieved. The modification of the setting, as well as the monitoring of the fluidized bed zone, usually takes place visually by an operator. However, in order to maintain a constant altitude of the fluid bed zone, a continuous control is necessary, since, under certain circumstances during the treatment process, modifications of the material to be processed may occur that necessitate corresponding modifications of the "flight altitude" of the tablets. It is also necessary to make different adjustments in situations where the material to be processed is different. Consequently, for good results during processing, expensive and cumbersome monitoring and manual setting by an operator are necessary. However, even careful monitoring by an operator cannot insure that an optimal setting is maintained continuously throughout the processing period. Optical illusions may affect the operator during visual control which can result in processing the tablets or the like in an undesirable manner.

SUMMARY OF THE INVENTION

The present invention relates to a device for use in fluidized bed techniques, particularly for coating tablets or the like, which comprises a container for use as a processing zone for the material to be processed, a means for moving the material through the processing zone, and a means for monitoring the upper end area of the processing zone. The present invention also provides a method for controlling the perimeters of a processing zone in fluidized bed techniques which utilizes gas circulation to create the processing zone. This method comprises the steps of detecting the value which represents the upper end area of the processing zone by means of a monitoring device and using the detected value to control the gas circulation in the processing zone.

Therefore, one object of the present invention is to provide a device by which the altitude of the fluidized bed can be preset so that changes in the material being processed which may occur during treatment may be readily detected.

Another object of the present invention is to provide a device which will automatically maintain a fluidized at a bed more or less constant altitude.

A further object of the present invention is to provide a monitoring device on the upper-end area of the processing zone for determining the upper culmination area of the material to be treated.

The monitoring device according to the present invention provides a means for reliably detecting when a certain flight altitude of the tablets is not achieved or is exceeded. The monitoring device then provides a value which represents the actual flight altitude of the material being processed. This simplifies the control of the processing zone to prevent errors which might occur otherwise, in certain cases, during direct visual monitoring.

An advantageous further development of the present invention provides for the monitoring device to be connected, in a controlled way, with a device, e.g. a gas volume valve or the like, by which the fluidized bed zone can be regulated, especially as to the extent of its height. Another control has also been provided. The second control is preferably a proportionate reset control which has been provided with a time delay means. Thus, the device according to the present invention provides an automatic control system by which it is possible to maintain the material to be processed at an approximately constant flight altitude, within a preselected range. Changes of the material to be processed that may occur during the treatment, e.g. weight increases in the tablets or the like during the coating process, etc., are detected automatically and may be controlled by increasing the throughput of the gas flow or similar means.

In another embodiment of the present invention, the device is provided with two zones that are delimited by a separating means, in particular by a cylindrical wall or the like, so that the tablets or the like move in an upward direction in one zone and in a downward direction in the other zone. In this embodiment, the monitoring device, with its sensor or sensors, is mounted above the means for separating the processing zone. In a device of this type, the monitoring of the "flight altitude" of the tablets or the like is especially important because, when the flight altitude is too low, disturbances of the treatment process may occur. Since the sensors mounted above the means of separation will detect when an excessively low flight altitude occurs, appropriate steps may be taken immediately to correct the situation.

In a device that has several delimited zones with an upward movement of the material to be processed and several delimited zones with a downward movement of the material to be processed, several monitoring devices with sensors can be mounted about the means of separating the processing zones. In a device with multiple processing zones, visual monitoring by one operator is particularly difficult. Thus, the monitoring device in accordance with the present invention presents special advantages.

In another embodiment of the present invention, one or more sensors of the monitoring device are mounted on the working container or the like in such a way that the sensors may be adjusted up and down. Thus, it is possible to adapt the processing zone to the chosen flight altitude of the particular material being processed. Also, it is possible to determine whether the material being processed is exceeding or remaining below the limit value to be detected, so that the processing zone may be adapted accordingly, if necessary.

The present invention also provides a method for controlling the culmination area of a fluidized bed zone which, in fluidized bed processes, is formed with the aid of a whirling gas circulation ("Wirbelgasumlauf"). The method according to the present invention comprises the steps of detecting the culmination area of the whirled-up material being processed, and using the detected value to control the whirling gas circulation. The detected value can also be used to control other devices which affect the processing zone.

In the following, the invention with its essential details will be explained in greater detail on the basis of the drawings.

DETAILED DESCRIPTION OF THE DRAWINGS

FIG. 4 is a schematic sectional lateral view of a container with several treatment zones separated from one another; and FIG. 5 is a top view of the container shown in FIG. 4.

DETAILED DESCRIPTION OF THE PREFERRED EMBODIMENTS

Figure 1:
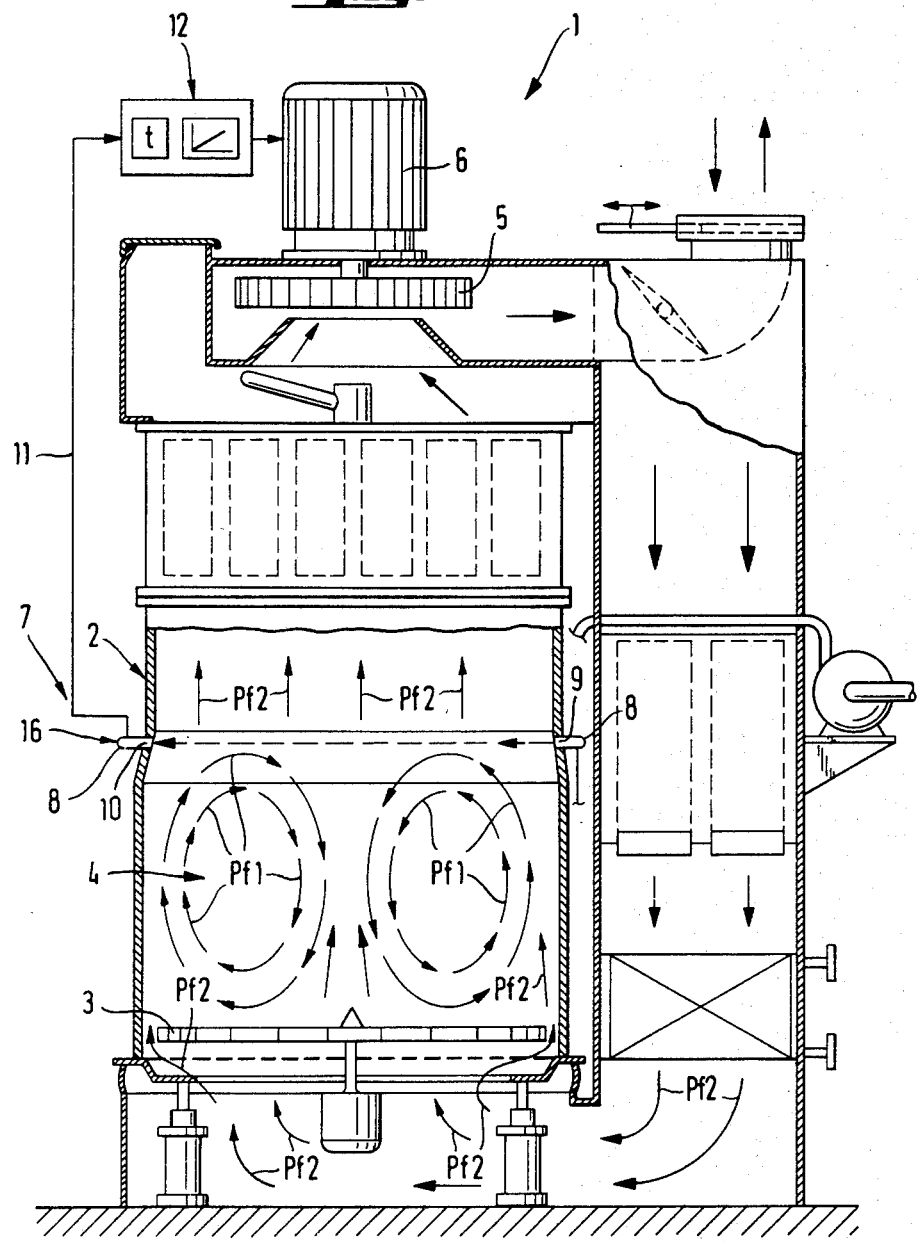
FIG. 1 is a schematic lateral view of a device for use in a fluidized bed technique, the device being shown partly in transverse section.
Figure 2:
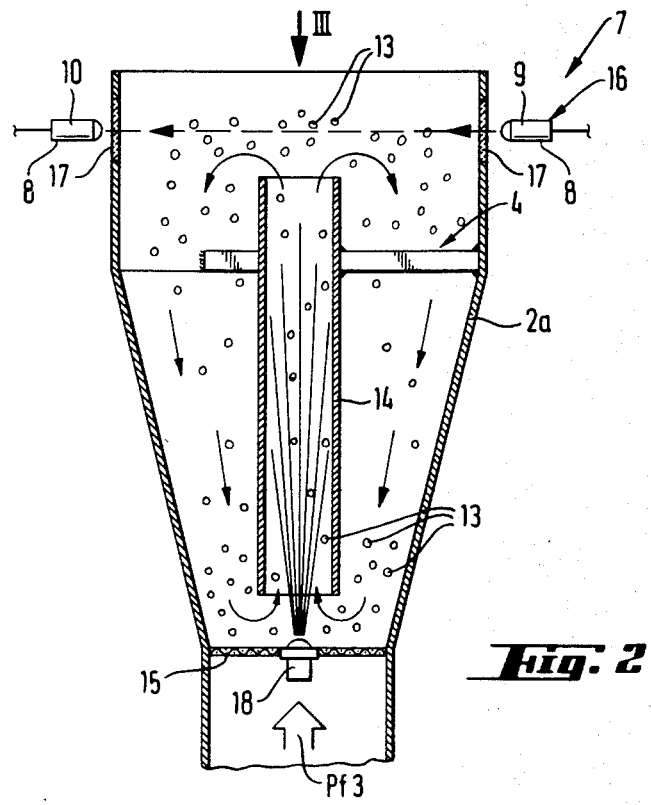
FIG. 2 is a schematic sectional lateral view of another embodiment of a container showing a sector in the region of the treatment zone.
Figure 3:
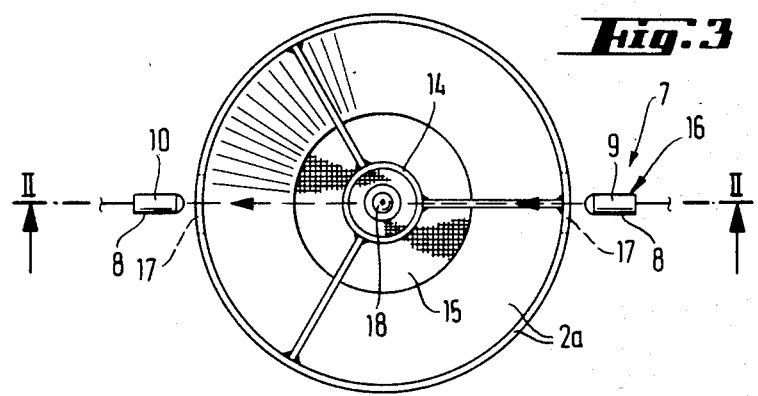
FIG. 3 is a top view of the container shown in FIG. 2.

A device 1 (FIG. 1) constitutes a rotor-fluidized bed installation within which it is possible to coat, granulate and dry the material to be processed. In particular, tablet cores may be provided with an outer coating in the device and dried subsequently. The device 1 has a working tower 2, the lower limit of which is defined by a rotor disc 3. Above the rotor disc 3, a sector of the working tower 2 forms a treatment zone 4, in which the material to be processed is moved around approximately according to the arrows Pf 1. The vortex motion is caused by a gas flow which permeates the working tower according to the arrows Pf 2. For that purpose, a conveying blower 5 with a driving motor 6 has been mounted on the upper end of the working tower 2. The gas and/or air may enter at the bottom end on the periphery of the rotor disc 3 between the rotary disc 3 and the wall of the working tower.

According to the present invention, a monitoring device 7 with sensors 8 has been provided in the upper area of the treatment zone 4, to detect the upper culmination area of the tablets and/or the cores of the tablets or the like. The sensor preferably comprises a light barrier having a light-transmitter 9 and a light-receiver 10, e.g. a photo-transistor or the like. The light-transmitter 9 and the light-receiver 10 are mounted on the working tower 2 in more or less diametrical opposition. When the processing zone containing the material to be processed and re-transported exceeds the height of the light barrier by a certain degree, an appropriate signal will register on the light-receiver 10. In the embodiment of the invention shown in FIG. 1, the light barrier is connected with the driving motor 6 of the conveyor blower 5 by way of a control mechanism 11 and a regulator 12 or a similar device. In that way, an automatic control system has been provided by which the volume or speed of the gas and/or air can be adjusted so that an approximately constant height extension of the fluidized bed containing the material to be processed will be maintained. When the altitude of the fluidized bed is so large that the beam of light from the light-transmitter 9 to the light-receiver 10 is interrupted, a signal for reducing the number of rotations will be forwarded to the driving motor 6. On the other hand, when the beam of light of the light barrier has a completely free passage, it is possible to increase the passage of gas to increase the flight altitude of the fluidized bed.

If necessary, a so-called "window discriminator" may be connected to the light barrier to evaluate the output signals of the window barrier that lie within its gate, and to detect any excesses or shortfalls which can be used as control signals for the driving motor.

In such an embodiment of the invention, the light barrier is connected with a regulator 12 that has an integral regulating characteristic. Thus, in the case of an appropriate output signal of the light barrier, an adjustment of the speed of rotation of the driving motor 6 will take place until the appropriate control signal from the light barrier appears no longer. It is convenient to equip the regulator 12 with a timing circuit, so as to prevent it from responding to momentary output signals.

If desired, the light barrier can also be set and/or mounted in such a way that it responds only when a boundary value is exceeded or is not reached. This feature is convenient, for example, when it is only necessary to prevent the flight altitude of the tablets from falling short of a certain altitude. To accomplish this, the light barrier is mounted slightly below the culmination area of the whirled tablets or the like in such a manner that the light barrier is largely interrupted. Consequently, if the flight altitude decreases, e.g. because of an increase in the weight of the tablets due to coating, the culmination area of the tablets would decrease somewhat, so that the light barrier will have a largely free passage. This will, in turn, give a signal to enlarge the volume of air passing through the processing zone.

The monitoring device 7 may also be connected, in a controlled way, with other mechanisms that affect the degree of the altitude of the fluidized bed zone. For example, in a corresponding manner, the speed of rotor disc 3 can be modified, if necessary, in combination with the speed of the conveying blower 5. A controlling connection with a gas volume valve, by-pass, or similar member is also possible. In addition, if desired or needed, supersonic or infrared barriers may be considered for use as sensors, instead of a light barrier.

FIGS. 2 to 5 show an embodiment of the processing zone of a device for use in fluidized bed techniques which has been delimited into multiple zones by a means of separation such as cylindrical walls. The tablets 13 or similar particles move upward in one zone and, if need be, are sprayed there with a coating or similar substance by means of a spray nozzle 18. The tablets 13 then carry out a downward and/or return movement in the other zone. In the embodiment shown in FIG. 2, a cylinder 14 is mounted centrally within the working tower 2a; the bottom end of the cylinder being placed at a certain distance from a sieve-like bottom 15. The gas supply takes place through the sieve-like bottom 15 (see arrow Pf 3). The interior of hollow cylinder 14 forms one delimited zone in which the tablets move in an upward direction. The flow of gas has been designed in such a way that a forward and return movement of the tablet in a rotating vortex will appear outside said cylinder 14. Above the upper end of the hollow cylinder 14, a light barrier 16 is mounted. In this embodiment of a fluidized bed installation, the monitoring of the flight altitude of the tablets or any similar particles is particularly important, because trouble may appear here when the passage of gas and/or the speed of the gas are no longer sufficient to convey the particles through the cylinder 14. In that case, the signal "minimum flight altitude" would be sufficient. But, if necessary, it is possible to detect when the material being processed falls below a certain predetermined culmination area, as well as when it has been exceeded. Furthermore, in this embodiment of the present invention, light barriers may be mounted on top of one another to delimit a permissible area by establishing limiting heights for exceeding and/or falling below the permissible area.

In particular, when light barriers 16 are used, they may be mounted within the area of viewing windows 17. This allows a monitoring device 7 to be added to a fluidized bed device at a later date without disrupting the working tower 2, 2a of the device 1. In addition, this ensures that the sensors are mounted with good protection.

Conveniently, the sensors of the monitoring device 7 are mounted in such a way that they may be moved up and down in relation to the working tower 2, 2a, in order to be capable of adapting to a predetermined altitude of the fluidized bed. In addition, the settings of the sensors may be adjusted in such a manner that one light barrier is set to detect and signal when a certain flight altitude has been exceeded, while another is set to detect and signal when the material falls below a predetermined flight altitude.

FIGS. 4 and 5 show a device 1 in which several hollow cylinders 14 have been mounted within a working tower 2b. One of the cylinders 14 is situated more or less in the central area of the working tower 2b, while the other six cylinders 14 have been mounted concentrically around it. In this design of a fluidized bed device, visual monitoring of the altitude of the zones of the fluidized bed by an operator is particularly problematic, since there is practically no possibility of seeing clearly whether the predetermined flight altitude of the tablets or similar objects is being maintained. However, this can be detected reliably by the monitoring device according to the present invention, which provides for arranging sensors in several monitored zones. In this embodiment of the present invention, three light barriers 16 have been arranged in such a way that they monitor several cylinders 14 at the same time. Depending on the design of the gas distribution, the out signals of the various light barriers may, among other things, be linked by way of logic linking elements, e.g. AND- or OR-elements. This will result in an output signal only being given when all three light barriers signal the exceeding or falling-short of a certain flight altitude. When a linkage by OR-elements exists, any one of the light-barriers will signal the exceeding of a boundary value.

As has been described above, depending on the design and arrangement of the monitoring device in accordance with the invention, the "flight altitude" of the material to be processed can be detected when it exceeds of falls below a predetermined boundary altitude. Then, the corresponding signal can be processed further. In addition, a permissible altitude and/or range of altitudes may be assumed as a mean culmination point for the material to be processed, said point being detected by one or, if need be, several superposed light barriers or similar sensors. Their output signals are then processed to maintain the flight altitude at a constant level by controlling devices that affect the fluidized bed zone, particularly as to its altitude, e.g. a gas volume valve, conveying blower 5, or a rotor disc 3/near the ground. This allows problems which occur to be detected and ruled out, particularly those caused by changes in weight and/or form of the material being processed which occur during processing or load changes. The adjustments will take place automatically and without any manual intervention. Thus, the device according to the present invention provides a more even treatment of the material being processed and, therefore, an improved finished product.

Besides the aforementioned monitoring of boundary values and/or the maintaining of a constant flight altitude, the monitoring may be used also to change the flight altitude after a predetermined run-off during the fluidized bed processing.

All characteristics that have been described in the Description, the Claims, and the Drawings can be essential to the invention when taken individually, as well as when combined in any way.

Having described the invention, many modifications thereto will become apparent to those skilled in the art to which it pertains without deviation from the spirit of the invention as defined by the scope of the appended claims.

What is claimed is:

1. A device for fluidized bed techniques, particularly for coating material such as tablets or the like, said device comprising a container for use as a processing zone for the material to be processed, means for moving said material through said processing zone, and at least two sensors for detecting the upper and lower critical height values of the upper end area of said processing zone, said sensors being mounted on said device one above the other.

2. A device according to claim 1 wherein said means for moving said material through said processing zone is an adjustable gas current.

3. A device according to claim 2 wherein said means for monitoring the upper end area of said processing zone is connected to a means for controlling said adjustable gas current.

4. A device according to claim 3 wherein said means for controlling said adjustable gas current is a proportionate reset control, such reset control being provided with a time delay means.

5. A device according to claim 1 wherein said sensors attached to said device in such a manner that said sensors may be independently adjusted in both an upward and downward direction.

6. A device according to claim 1 wherein each of said sensors is provided with at least one light barrier.

7. A device according to claim 1 which further comprises a means for separating said processing zone into multiple processing zones in which said material to be processed moves in an upper direction in one of said zones and in a downward direction in another of said zones.

8. A device according to claim 7 wherein said sensors are mounted to said device above said means for separating said processing zone.

9. A device according to claim 8 which further comprises multiple sensors which are mounted above said means for separating said processing zone.

10. A device according to claim 9 which further comprises logic elements for linking said multiple sensors.

11. A device according to claim 10 wherein said multiple sensors are arranged in such a manner that more than one zone is monitored at the same time by a single pair of sensors.

12. A device according to claim 1 wherein said sensors are attached to said device in such a manner that said sensors are within the range of viewing windows.

13. In a fluidized bed technique utilizing gas circulation to create a processing zone, a method for controlling the perimeters of said processing zone which comprises the steps of detecting the value which represents the upper end area of said processing zone by means of at least two sensors which are mounted on said device one above the other and using said value to control said gas circulation in said processing zone.

14. A method according to claim 13 wherein said detected value is used to control additional devices that may affect said processing zone.

* * * * *